Mar. 20, 1923.
F. N. FLYNN ET AL
ELECTROLYTIC PROCESS
Filed Oct. 29, 1919
1,448,923
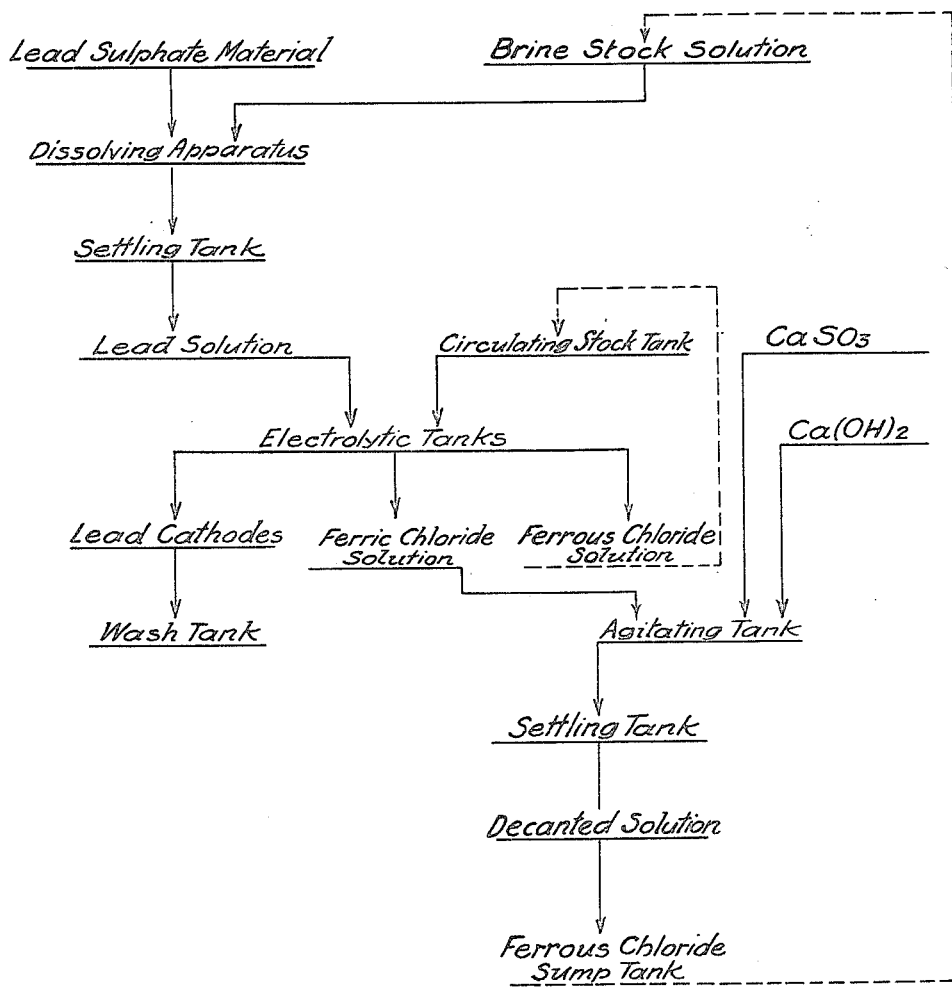
George D. Van Arsdale and
Francis N. Flynn
Inventors
By their Attorney
Edward Thomas Patented Mar. 20, 1923.

1,448,923

UNITED STATES PATENT OFFICE.

FRANCIS N. FLYNN, OF EAST ORANGE, NEW JERSEY, AND GEORGE D. VAN ARSDALE, OF NEW YORK, N. Y.

ELECTROLYTIC PROCESS.

Application filed October 29, 1919. Serial No. 334,342.

*To all whom it may concern:*

Be it known that we, FRANCIS N. FLYNN and GEORGE D. VAN ARSDALE, citizens of the United States, and respectively residents of East Orange, Orange County, New Jersey, and New York, New York, have invented certain new and useful Improvements in Electrolytic Processes, of which the following is a specification.

This invention relates to processes for electrolytic precipitation, and is herein disclosed as applied to the reduction of lead sulphate to lead.

The commonly used present method for reducing lead sulphate is by smelting in a blast furnace, with the production of silver-lead bullion or antimonial lead, and possibly to an impure lead. This method has many disadvantages. For example, it is quite impossible to reduce the lead sulphate by fuel alone. If the lead sulphate is not mixed with at least six times its weight of other smeltable material it becomes impossible to keep the furnace in continuous operation. It is also necessary that a large percentage of the silica in the smelting mixture exists as uncombined silica, which frequently requires the use of barren silica flux. The many difficulties encountered in smelting lead sulphate are well known to those skilled in the art.

A method for the reduction of lead sulphate to metallic lead, which would overcome the many objectionable features found in smelting, would automatically cause the production of larger amounts of lead sulphate than is now available for treatment. The source of this largely increased tonnage would be from plants treating complex lead zinc sulphide ores, which would then be stimulated to treat such ores for the production of lead sulphate because of the improved method of reducing it to metallic lead. In fact a successful method for the treatment of lead sulphate may be said to be the key to the successful treatment of low grade complex sulphide ores.

Hydro-metallurgical methods for the treatment of lead sulphate have been proposed but none of these have as yet proven to be commercially successful. For example, the proposal has been made to dissolve lead sulphate in a saturated solution of brine, subsequently precipitating the lead by means of lime or other substances producing an insoluble lead compound. This suggestion, while it might be applicable to oxidized lead ores, would not be suitable for the treatment of lead sulphate, since the precipitated lead compound would be largely contaminated with calcium sulphate, in which case both the lead compound together with the calcium sulphate would have to be smelted.

It has been proposed to dissolve lead sulphate in a saturated brine solution, and precipitate the lead electrolytically therefrom, making use of a soluble anode of metallic iron. The use of a soluble iron anode is objectionable for commercial reasons because of the fact that the iron is dissolved practically in chemical proportion to the amount of lead precipitated. The use of a so-called insoluble anode has not been practicable, first, because of the evolution of free chlorine at the anode, and secondly because, materials such as graphite or carbon cannot be used on account of their more or less rapid disintegration under these conditions.

We have discovered a method of treating lead sulphate, for the production of metallic lead, which overcomes the above described difficulties.

Our method consists of the following steps:

A. Dissolve lead sulphate in a suitable solvent, such as a nearly saturated brine or solution of sodium or calcium or magnesium chloride, containing a quantity of an easily oxidizable salt such as ferrous chloride, in amounts and for the purpose described below.

B. Electrolyze the solution of lead thus obtained using lead or iron cathode, and an insoluble anode which latter may be graphite, carbon, magnetite, insoluble alloy of iron containing silicon, or other suitable substance.

C. Reduce the oxidized salt or ferric iron resulting from the depolarizing action of the ferrous chloride during the electrolyses to the ferrous condition, by means of any suitable reducing agent such as sulphur dioxide.

D. Precipitate and remove from the solution resulting from electrolysis a portion of the sulphate radical. This may be done by adding lime or other substance capable of forming an insoluble sulphate, the quantity of lime or other substance added being sufficient to prevent the accumulation of the sulphate radical. The solution thus treated is readily usable for dissolving fresh quantities of lead sulphate, and a repetition of the cycle.

An example of a way in which this process may be carried out is as follows:

(a) Lead sulphate, or the material containing lead sulphate, is charged into a suitable apparatus, and brought into contact with the brine solution, for such time as might be required for its solution. The resulting solution is then removed or decanted from any insoluble residue.

This solution containing approximately one per cent of lead, in the regular course of operation is now ready for electrolysis. In starting operations in the first instance, there is added to this solution a quantity of ferrous chloride. The object of this being to act as a depolarizing agent in the subsequent electrolytic step, and to prevent disintegration of the anode. The amount of iron present in solution as ferrous chloride must be in excess of the chemical equivalent of lead precipitated during any cycle.

The brine-lead-ferrous-chloride solution is then electrolyzed in the usual way, utilizing an anode of graphite or other suitable material.

During the electrolysis no free chlorine is evolved at the anode, and the chlorine which would have been evolved if no ferrous chloride were present, acts in such a way, that the ferrous chloride is oxidized to ferric chloride. It is usually advantageous to precipitate by electrolysis at this stage as much of the lead as possible, so that the resulting solution may contain as little as 0.01% of lead.

The resulting solution after suitable treatment may be used for dissolving more lead sulphate.

To effect this treatment the solution as it leaves the electrolytic tanks is carried into a suitable apparatus for treatment, to reduce the ferric iron to ferrous iron, and to precipitate the amount of sulphate radical requiring removal.

It is of course obvious that ferric chloride formed in each cycle must be again reduced to the ferrous condition for two reasons, 1st, any considerable amount of ferric chloride has a very disadvantageous effect in seriously reducing the cathodic deposition efficiency and secondly, because it is desirable to have as large a proportion of total iron as possible during electrolyses in the ferrous condition in order to make use of its depolarizing action.

Sulphur dioxide or sulphur dioxide combined with lime as calcium sulphite, may be used to reduce the ferric iron to the ferrous condition. If sulphur dioxide is used the operation may take place in a tower, like that in use for similar purposes. If calcium sulphite is used the calcium sulphite is prepared in any suitable manner and added to the solution in any suitable agitating apparatus. It may be advisable to reduce the ferric iron in other ways, depending on local conditions and materials available for treatment.

For example, instead of using sulphur dioxide produced in the usual dry way, it may be found advantageous and more convenient to obtain the chemical equivalent result in the wet way by bringing the solution containing the ferric chloride in contact with a sulphide ore, capable of being acted on and dissolved by the ferric chloride. This may serve to extract one or more of the valuable constituents of the sulphide ore.

It is obvious that in the treatment of lead sulphate in the manner described there will be an accumulation of sulphuric acid either free or combined. And it is also obvious that to preserve the solvent action of the brine liquors on lead sulphate, that this be not allowed to accumulate to any great extent. It will be necessary therefore at this point in each cycle to agitate with sufficient lime or add other precipitant of sulphuric acid, to precipitate an amount of sulphuric acid necessary to prevent its accumulation in the cycle. The resulting precipitate may be removed by settling and drawing off the solution or by other suitable methods. The solution thus prepared is ready for the repetition of the cycle, as by pumping it back to the lead sulphate dissolving apparatus.

The metallic lead as removed from the electrolytic tanks is washed to remove the bulk of the brine solution, dried and melted in a suitable apparatus, and cast into such form as is desired.

The accompanying flow sheet shows substantially only the steps disclosed as especially advantageous to the carrying out of the present process. Many other steps and processes which may well be used, and in practice often are used, are omitted for the sake of clearness.

Certain feaures of the invention has been described in great detail to enable those skilled in the art to appreciate some of its advantages.

What is claimed as the present invention is:

1. The process of electrolytically depositing lead which comprises passing the current through a brine solution containing both lead and a substance capable of acting as a depolarizing agent at the anode during the electrolysis.

2. The process of electrolyzing a solution containing chloride of lead in solution which comprises passing the current through said solution in the presence of enough ferrous chloride to inhibit the evolution of any free chlorine at the anode.

3. The process of electrolyzing a solution containing the chloride of a metal, which comprises electrolyzing it in the presence of a chloride less easily electrolyzed and which is adapted to prevent the evolution of any free chlorine at the anode.

4. The process of recovering lead from lead sulphate which comprises treating the lead sulphate with a strong brine solution, and electrolyzing the resulting solution in the presence of enough dissolved ferrous chloride to prevent the evolution of any free chlorine at the anode.

5. The process of recovering lead from lead sulphate which comprises treating the lead sulphate with a strong brine solution to dissolve lead as chloride, electrolyzing the resulting solution in the presence of enough dissolved ferrous chloride to prevent the evolution of any free chlorine at the anode and thereby to protect the anode restoring the solution to the form of a brine substantially free from sulphates by precipitating a portion of the latter therefrom and having the iron present as ferrous chloride, and treating more lead sulphate with the restored solution.

6. The process of recovering lead from lead sulphate which comprises treating the lead sulphate with a strong brine solution to dissolve lead as chloride, electrolyzing the resulting solution in the presence of enough dissolved ferrous chloride to prevent the evolution of any free chlorine and thereby to protect the anode, reducing the oxidized iron to ferrous chloride, removing a substantial portion of the sulphate radical, and using the resulting solution to treat more lead sulphate.

7. The process of recovering lead from lead sulphate which comprises treating the lead sulphate with a strong brine solution to dissolve lead as chloride, electrolyzing the resulting solution in the presence of enough dissolved ferrous chloride to prevent the evolution of any free chlorine and thereby to protect the anode, treating the resulting solution with sulphur dioxide to reduce the iron to the ferrous condition, removing a substantial portion of the sulphate radical with lime, clearing the solution of any precipitate, and using the cleared solution to treat more lead sulphate.

8. The process of recovering lead from lead sulphate which comprises treating the lead sulphate with a strong brine solution to dissolve lead as chloride, electrolyzing the resulting solution in the presence of enough dissolved ferrous chloride to prevent the evolution of any free chlorine and thereby to protect the anode, treating the resulting solution with sulphur dioxide combined with lime to reduce the iron to the ferrous condition, removing a substantial portion of the sulphate radical with lime, clearing the solution of any precipitate, and using the cleared solution to treat more lead sulphate.

9. The process of recovering lead from lead sulphate which comprises treating the lead sulphate with a strong brine solution to dissolve lead as chloride, electrolyzing the resulting solution in the presence of enough dissolved ferrous chloride to prevent the evolution of any free chlorine and thereby to protect the anode, treating the resulting solution with a sulphur containing substance adapted to react with the ferric chloride to reduce the iron to the ferrous condition, removing a substantial portion of the sulphate radical with lime, clearing the solution of any precipitate, and using the cleared solution to treat more lead sulphate.

10. The process of recovering lead from lead sulphate which comprises treating the lead sulphate with a strong brine solution to dissolve lead as chloride, electrolyzing the resulting solution in the presence of enough dissolved ferrous chloride to prevent the evolution of any free chlorine and thereby to protect the anode, treating the resulting solution with a sulphide ore adapted to react with the ferric chloride to reduce the iron to the ferrous condition, removing a substantial portion of the sulphate radical with lime, clearing the solution of any precipitate, and using the cleared solution to treat more lead sulphate.

FRANCIS N. FLYNN.
GEORGE D. VAN ARSDALE.